(12) United States Patent
Baumert et al.

(10) Patent No.: US 6,397,592 B1
(45) Date of Patent: Jun. 4, 2002

(54) HYDRAULIC SYSTEM FOR A MOTOR VEHICLE HAVING A HINGED CONVERTIBLE TOP

(75) Inventors: Jochen Baumert, Frankfurt; Eckhart Kern, Hofheim, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/600,339

(22) PCT Filed: Dec. 16, 1998

(86) PCT No.: PCT/EP98/08250
§ 371 (c)(1),
(2), (4) Date: Sep. 11, 2000

(87) PCT Pub. No.: WO99/36282
PCT Pub. Date: Jul. 22, 1999

(30) Foreign Application Priority Data

Jan. 14, 1998 (DE) .......................... 198 00 985

(51) Int. Cl.[7] .............................................. F16D 31/02
(52) U.S. Cl. ............................ 60/423; 60/476; 60/484; 91/430; 91/436
(58) Field of Search .................... 60/476, 489, 423, 60/427; 91/530, 536

(56) References Cited

U.S. PATENT DOCUMENTS 2,640,323 A * 6/1953 McLeod ................... 60/476
3,575,192 A * 4/1971 MacDuff ................. 137/116
3,579,987 A * 5/1971 Busse ...................... 60/52
4,208,874 A * 6/1980 Field, Jr. .................. 60/484
4,310,062 A * 1/1982 Link et al. ............... 60/484
5,279,119 A * 1/1994 Shelhart et al. .......... 60/476
5,375,418 A * 12/1994 Shelhart et al. .......... 60/394
5,467,596 A * 11/1995 Yu .......................... 60/415

FOREIGN PATENT DOCUMENTS

| DE | 3826788 | 2/1990 |
| DE | 3826789 | 2/1990 |
| DE | 9000577 | 3/1990 |
| DE | 4407739 | 7/1995 |
| DE | 19523784 | 2/1996 |
| EP | 0693390 | 1/1996 |

* cited by examiner

Primary Examiner—F. Daniel Lopez
Assistant Examiner—Igor Kershteyn
(74) Attorney, Agent, or Firm—Martin A. Farber

(57) ABSTRACT

A hydraulic system for a motor vehicle having a convertible top (2) which can be folded back has a convertible-top control system (1) and further hydraulic control devices (3, 4) which can be activated by a common hydraulic pump (6). In hydraulic lines (8, 9) leading to the convertible-top control system (1) there are arranged hydraulic valves (13, 14) which enable optional operation of the convertible-top control system (1) or of the further control devices (3, 4). Because of this, the hydraulic system turns out to be particularly simple structurally.

15 Claims, 3 Drawing Sheets

HYDRAULIC SYSTEM FOR A MOTOR VEHICLE HAVING A HINGED CONVERTIBLE TOP

FIELD AND BACKGROUND OF THE INVENTION

The invention relates to a hydraulic system for a motor vehicle having a convertible top which can be folded back, with a convertible-top control system which can be operated by a hydraulic pump.

Hydraulic systems of this type are frequently used in modern motor vehicles described as convertibles and are known from practical experience. For safety reasons the convertible top can only be opened or closed when the motor vehicle is at a standstill or when traveling at a low speed, for example of less than 10 km/h. The other control devices which are arranged in the motor vehicle serve, for example, for the activation of adjustable spring struts, a transmission control system or an additional steering system for a rear axle. In known motor vehicles these hydraulic control devices are activated via their own hydraulic circuits and via hydraulic pumps or pressure accumulators additionally arranged in the motor vehicle.

SUMMARY OF THE INVENTION

The invention is based on the problem of providing a hydraulic system of the type mentioned at the beginning in such a manner that it is constructed as simply as possible and can be produced cost-effectively.

According to the invention, this problem is solved in that in a hydraulic line, which leads to the convertible-top control system, there is arranged a controllable hydraulic valve for the activation of a further hydraulic control device for operating a further functional unit of the motor vehicle.

In one refinement the convertible-top control system and the further hydraulic control device are switched on at the same time, there being a clear distinction between the power consumption of the convertible-top control system and the control device as an alternative to this, the further hydraulic control device can be activated only with the convertible-top control system switched off.

This enables the hydraulic system according to the invention to be used for the activation of the further hydraulic control devices when the convertible-top control system is not in use. Since the two devices have approximately the same power requirement, the hydraulic pump does not need to be adapted for the system according to the invention. Because of this, the hydraulic system according to the invention is of particularly simple construction and can be produced cost-effectively. Since, thanks to the invention, in each case either the convertible-top control system or one of the further hydraulic devices can be activated, pressure fluctuations do not arise in the hydraulic lines. Therefore, only a small pressure accumulator or none at all is needed as a buffer for operation of the further control devices. This results in a further reduction in the structural design of the system according to the invention.

The system according to the invention requires a particularly small structural design if a control electronics unit of the hydraulic pump is provided for the activation of the hydraulic valve. Furthermore, a designated pressure level can be produced for each of the hydraulic control devices by the simultaneous activation of the hydraulic pump and of the hydraulic valve.

According to another advantageous development of the invention, mutual interference of two further control devices can be avoided if the hydraulic pump is designed for the conveying of hydraulic oil in both directions, and a hydraulic valve is arranged in each of the hydraulic lines leading to the convertible-top control system.

According to another advantageous development of the invention, a multiplicity of hydraulic control devices can be operated in a simple manner with particularly low outlay if a plurality of branches to the hydraulic control devices are arranged in one of the hydraulic lines leading to the convertible-top control system. If certain hydraulic control devices are only to be activated separately, this can be achieved via further hydraulic valves which can be controlled by the control electronics unit.

In the case of hydraulic control devices which can be activated in parallel, a drop in pressure in one of the hydraulic control devices when a further hydraulic device is switched on can be avoided in a simple manner if a nonreturn valve is in each case arranged between the branches and the control devices. Because of the nonreturn valves, discharging of the hydraulic oil from the hydraulic control device activated first is reliably avoided.

According to another advantageous development of the invention, a plurality of hydraulic control devices, which require the same volume flow of hydraulic oil at essentially the same time, can be operated with a small number of hydraulic lines if one hydraulic line is designed as a return line of one of the hydraulic control devices and as a supply line of a further hydraulic control device.

According to another advantageous development of the invention, a multiplicity of hydraulic control devices can be operated without mutual interference if a plurality of hydraulic valves, which in each case activate hydraulic control devices, are arranged in series in one of the hydraulic lines, each of the hydraulic valves being formed as a shuttle valve. By means of this design, when one hydraulic control device arranged close to the hydraulic pump is activated, all of the hydraulic control devices arranged further away are automatically switched off. Each of the hydraulic control devices is hereby assigned a priority. The convertible-top control system can therefore be arranged next to the hydraulic pump and, for example, the hydraulic control device for the rear-wheel steering system can be arranged in second place.

BRIEF DESCRIPTION OF THE DRAWINGS

The invention permits numerous embodiments. To further clarify its basic principle a plurality of these are represented in the drawings and are described in the following. The drawings show in FIG. 1 a schematic representation of a hydraulic system according to the invention with a convertible-top control system and two control devices, and FIGS. 2–5 further embodiments of the hydraulic system according to the invention.

DETAILED DESCRIPTION OF THE PREFERRED EMBODIMENT

Figure 1:
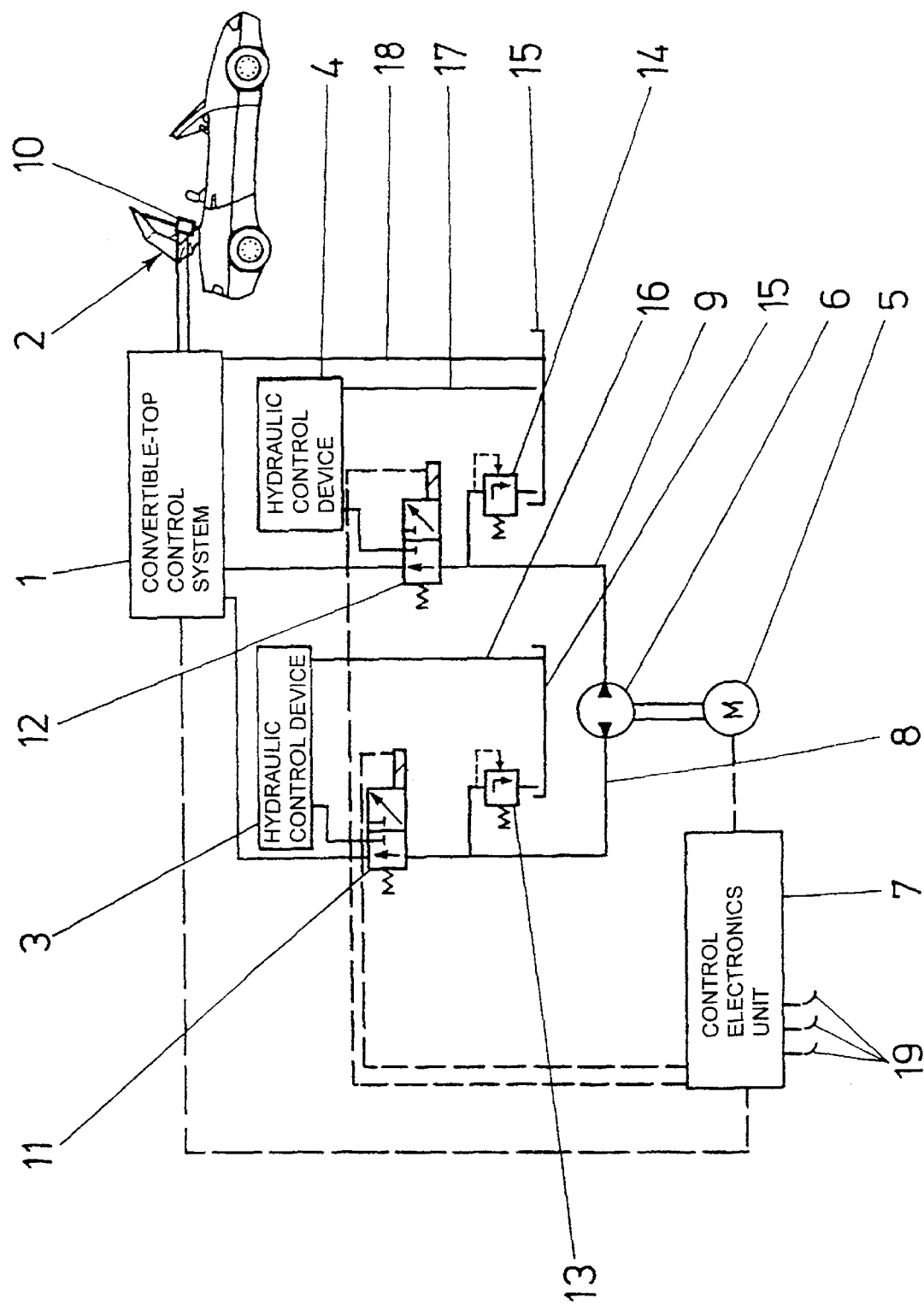

FIG. 1 shows a hydraulic system according to the invention with a convertible-top control system 1 for opening and closing a convertible top 2 of a motor vehicle, and with two further hydraulic control devices 3, 4. The hydraulic system has a hydraulic pump 6, which can be driven in both directions by an electric motor 5, and a control electronics unit 7. With the control electronics unit 7, the conveying direction and the conveying volume of the hydraulic pump 6 can be controlled. Two hydraulic lines 5, 9 lead from the hydraulic pump 6 to the convertible-top control system 1. The convertible-top control system 1 has a hydraulic cylinder 10 which is coupled to the convertible top 2 of the motor vehicle. To simplify the drawing, a single hydraulic cylinder 10 is shown. Arranged in the hydraulic lines 8, 9 are hydraulic valves 11, 12 which can in each case be controlled electrically by the control electronics unit 7 and with which the hydraulic control devices 3, 4 can be activated. Furthermore, FIG. 1 shows that pressure control valves 13, 14, which are connected to a common reservoir 15, are arranged in the hydraulic lines 8, 9. Return lines 16–18 lead in each case from the convertible-top control system 1 and the hydraulic control devices 3, 4 into the reservoir 15.

The hydraulic valves 11, 12 are designed as shuttle valves and in the basic position shown are preloaded into a position which enables the convertible top 2 to be activated. Since the hydraulic control devices 3, 4 are in each case connected to one of the hydraulic lines 8, 9, in each case only one of the hydraulic control devices 3, 4 can be activated, corresponding to the conveying direction of the hydraulic pump 6. Electric signal lines 19 lead from the control electronics unit 7 to switches and measuring devices which are not shown. The measuring devices may, for example, be a motor-vehicle speedometer. It is thereby possible, for example above a designated motor-vehicle speed, to block the convertible-top control system 1 by the control electronics unit 7.

The hydraulic control devices 3, 4 may, for example, be a level adjustment of spring struts of the motor vehicle. By this means, with the system according to the invention compensation for the spring travel or a difference in wheel load when loading, or the raising and lowering of the motor vehicle, for example as a function of the speed thereof, may be undertaken.

Figure 2:
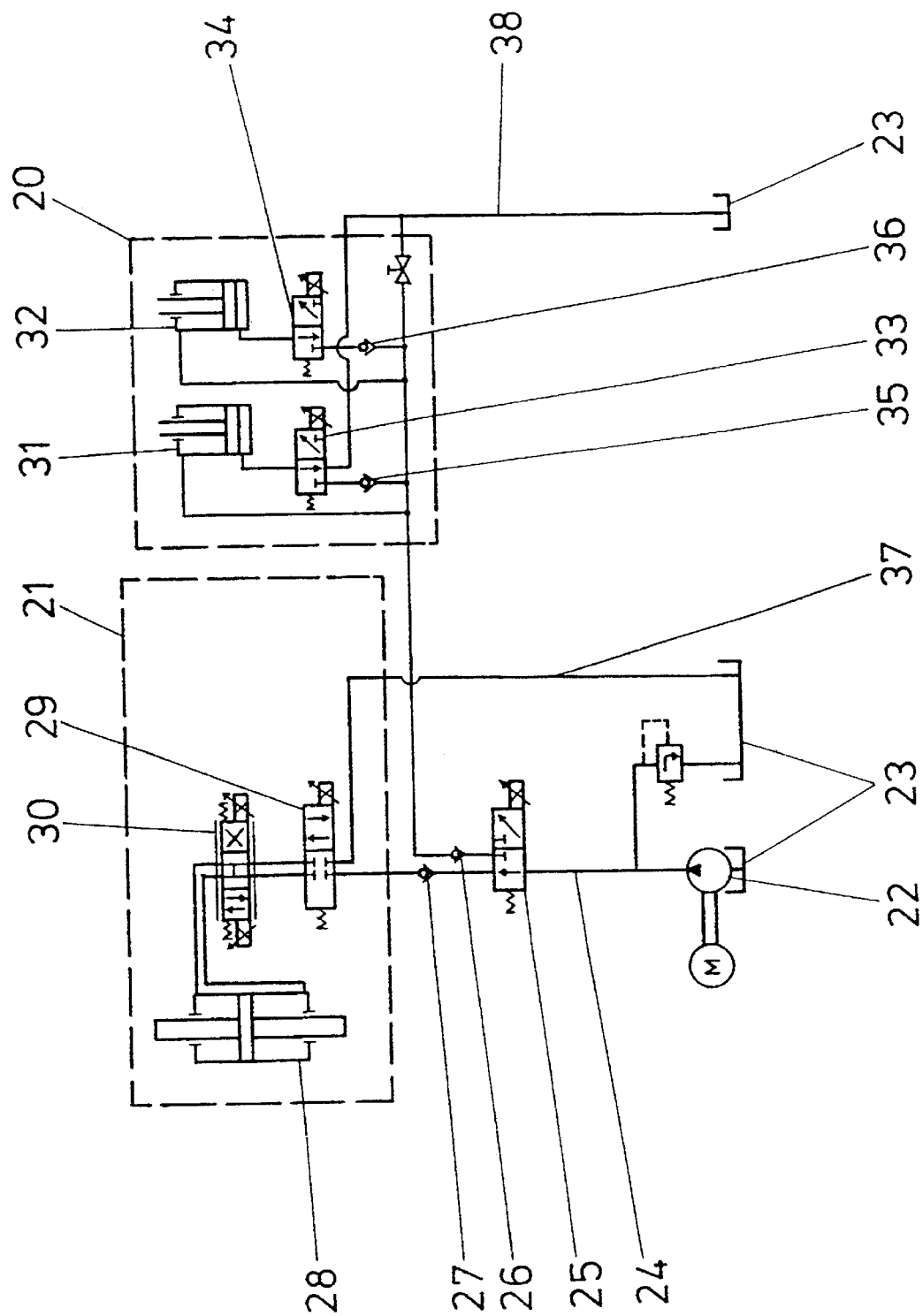

FIG. 2 shows a further embodiment of the hydraulic system according to the invention with a convertible-top control system 1 and with a hydraulic control device 2 for a rear-wheel steering system of the motor vehicle. The system according to the invention has a hydraulic pump 22 which draws in hydraulic oil from a reservoir 23 and conveys it via a hydraulic line 24 to a controllable hydraulic valve 25. The hydraulic valve 25 has two switching positions for the optional activation of the convertible-top control system( 20 and op the control device 21 for the rear-wheel steering system. Nonreturn valves 26, 27 are in each case arranged between the hydraulic valve 25 and the convertible-top control system 20 and also the control device 21 for the rear-wheel steering system. The nonreturn valves 26, 27 prevent hydraulic oil from flowing back via the hydraulic pump 22 into the reservoir 23. The hydraulic control device 21 of the rear-wheel steering system has a double action differential cylinder 28 which can be activated via two electrically controllable valves 29, 30. The convertible-top control system 20 has two hydraulic cylinders 31, 32 which can in each case be activated by means of controllable valves 33, 34 and nonreturn valves 35, 36. Furthermore, FIG. 2 shows that the convertible-top control system 20 and the control device 21 for the rear-wheel steering system are in each case connected to the reservoir 23 via return line 37, 38.

Figure 3:
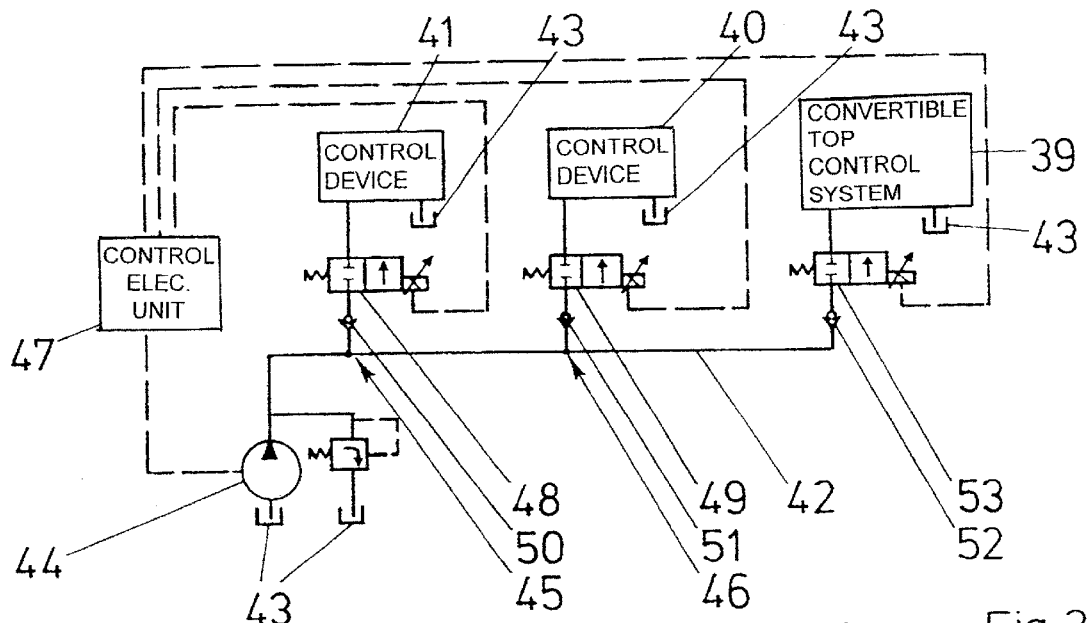

FIG. 3 shows a further embodiment of the hydraulic system according to the invention with a convertible-top control system 39 and two further control devices 40, 41. The convertible-top control system 39 is connected via a hydraulic line 42 to a hydraulic pump 44 conveying hydraulic oil from a reservoir 43. A plurality of branches 45, 46 for the control device s 40, 41 are arranged in the hydraulic line 42. Hydraulic valves 48, 49, which can be activated by a common control electronics unit 47, and in each case one nonreturn valve 50, 51 are arranged between the control devices 40, 41 and t he branches 45, 46. The convertible-top control system 39 likewise has a nonreturn valve 52 and an activatable hydraulic valve 53. The control electronics unit 47 serves to switch the hydraulic valves 48, 49, 53 in such a manner that the convertible-top control system 39 and the two control devices 40, 41 can be operated at the same time. The control devices 40, 41 may, for example, be an adjustable differential of the driving axle of the motor vehicle or a hydraulic boost for a manually-operated transmission (not shown). Furthermore, the control devices 40, 41 can be designed for the hydraulic boosting of a motor-vehicle clutch (not shown). Such control devices 40, 41 require a low volume flow of hydraulic oil, so that there is no risk of mutual interference between the two control devices 40, 41 when they are operated at the same time.

Figure 4:
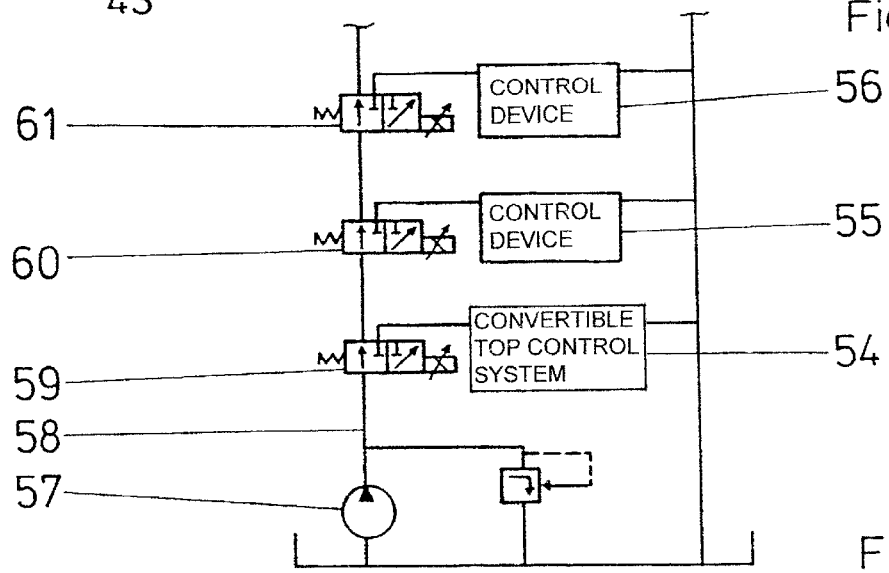

FIG. 4 shows a further embodiment of the hydraulic system according to the invention, with a convertible top control system 54 and two further control devices 55, 56. The system according to the invention has a hydraulic pump 57 and a plurality of hydraulic valves 59–61 arranged in series in a hydraulic line 58. The hydraulic valves 59–61 are in each case designed as a shuttle (changeover) valve having two switching positions, so that either the control device 55, 5 and the convertible-top control system 54, which are connected to the respective hydraulic valve 59–61, or the following hydraulic valve 59–61 is connected to the hydraulic pump 57. As a result, by corresponding switching of the hydraulic valves 59, 61 in each case only the convertible-top control system 54 or only one of the control devices 55, 56 can be operated.

The control devices 55, 56 may, for example, be designed for adjusting aerodynamic components of the motor vehicle as a function of the motor-vehicle speed, or for adjusting a radiator or air-flow apertures for the motor-vehicle radiator as a function of the cooling-air requirements. The control devices 55, 56 may furthermore serve for adjusting vehicle seats or for locking vehicle doors or for activating a parking brake.

Figure 5:
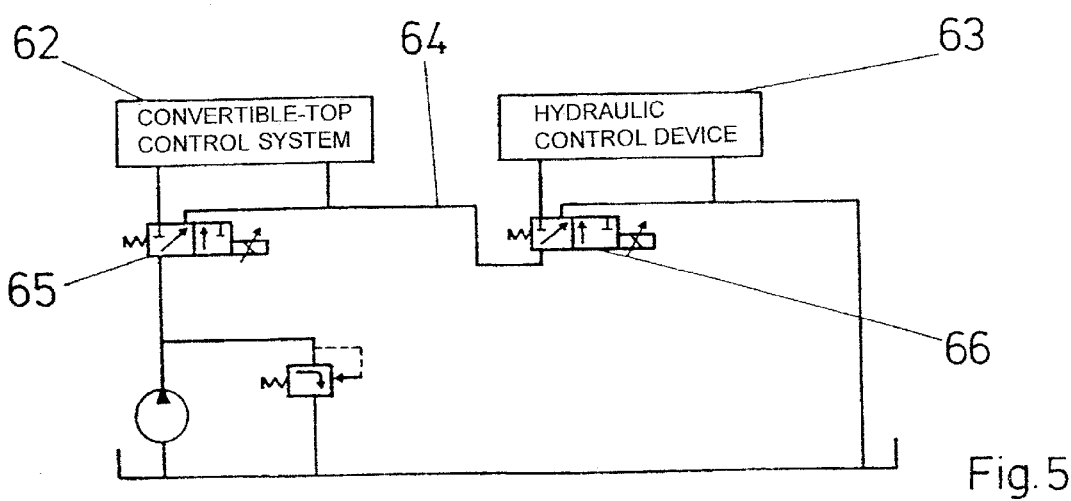

FIG. 5 shows a further embodiment of the hydraulic system according to the invention, with a convertible-top control system 62 and a hydraulic control device 63. A hydraulic line 64 is designed in this case as a return line of the convertible-top control system 62 and at the same time as a supply line of the control device 63. Furthermore, the hydraulic system has two hydraulic valves 65, 66 by means of which the control device 63 and the convertible-top control system 62 can in each case be activated or bypassed.

The control device 63 is, for example, a control device for head restraints, which control device only builds up a slight difference in pressure.

We claim:

1. A hydraulic system for a motor vehicle having a convertible top which is able to be folded back, with a convertible-top control system which is able to be operated by a hydraulic pump, wherein in a hydraulic line (8, 9, 24, 42, 58, 64), which leads to the convertible-top control system (1, 20, 39, 54, 62), there is arranged a controllable hydraulic valve (11, 12, 25, 48, 49, 53) for activation of a hydraulic control device (3, 4, 21, 40, 41, 55, 56, 63) for operating a further functional unit of the motor vehicle, wherein the hydraulic pump is provided for conveying of hydraulic oil in both directions, and said hydraulic valve (11, 12) is arranged respectively in each of the hydraulic lines (8, 9) leading to the convertible-top control system (1).

2. The hydraulic system as claimed in claim 1, wherein said convertible-top control system (1, 20, 39, 54, 62) and said further hydraulic control device (3, 4, 21, 40, 41, 55, 56, 63) are switched on at the same time.

3. The hydraulic system as claimed in claim 1, wherein said further hydraulic control device (3, 4, 21, 40, 41, 55, 56, 63) is activatable with the convertible-top control system switched off.

4. The hydraulic system as claimed in claim 1, wherein a control electronics unit (7, 47) of the hydraulic pump (6, 44) is provided for activation of the hydraulic valve (11, 12, 48, 49, 53).

5. The hydraulic system as claimed in claim 1, wherein a plurality of branches (45, 46) to the hydraulic control devices (40, 41) are arranged in one of the hydraulic lines (42) leading to the convertible-top control system (39).

6. The hydraulic system as claimed in claim 5, wherein a nonreturn valve (50, 51) is in each case arranged between the branches (45) and the hydraulic control devices (40, 41).

7. The hydraulic system as claimed in claim 1, wherein a plurality of hydraulic valves (59–61), which in each case activate hydraulic control devices (convertible-top control system 54, 55, 56), are arranged in series in said hydraulic line (58), each of the hydraulic valves (59–61) being a changeover valve.

8. A hydraulic system for a motor vehicle having a convertible top which is able to be folded back, with a convertible-top control system which is able to be operated by a hydraulic pump, wherein in a hydraulic line (8, 9, 24, 42, 58, 64), which leads to the convertible-top control system (1, 20, 39, 54, 62), there is arranged a controllable hydraulic valve (11, 12, 25, 48, 49, 53) for activation of a further hydraulic control device (3, 4, 21, 40, 41, 55, 56, 63) for operating a further functional unit of the motor vehicle, wherein said hydraulic line (64) is a return line of the convertible-top control system and as a supply line of a further hydraulic control device.

9. The hydraulic system as claimed in claim 8, wherein the hydraulic pump is provided for conveying of hydraulic oil in both directions, and said hydraulic valve (11, 12) is arranged respectively in each of the hydraulic lines (8, 9) leading to the convertible-top control system (1).

10. The hydraulic system as claimed in claim 8, wherein said convertible-top control system (1, 20, 39, 54, 62) and said further hydraulic control device (3, 4, 21, 40, 41, 55, 56, 63) are switched on at the same time.

11. The hydraulic system as claimed in claim 8, wherein said further hydraulic control device (3, 4, 21, 40, 41, 55, 56, 63) is activatable with the convertible-top control system switched off.

12. The hydraulic system as claimed in claim 8, wherein a control electronics unit (7, 47) of the hydraulic pump (6, 44) is provided for activation of the hydraulic valve (11, 12, 48, 49, 53).

13. The hydraulic system as claimed in claim 8, wherein a plurality of branches (45, 46) to the hydraulic control devices (40, 41) are arranged in the hydraulic lines (42) leading to the convertible-top control system (39).

14. The hydraulic system as claimed in claim 13, wherein a nonreturn valve (50, 51) is in each case arranged between the branches (45) and the hydraulic control devices (40, 41).

15. The hydraulic system as claimed in claim 8, wherein a plurality of hydraulic valves (59–61), which in each case activate hydraulic control devices (convertible-top control system 54, 55, 56), are arranged in series in said hydraulic line (58), each of the hydraulic valves (59–61) being a changeover valve.

\* \* \* \* \*